Feb. 28, 1950 G. E. FRANCK 2,499,022
VALVE MEANS
Filed Nov. 29, 1945
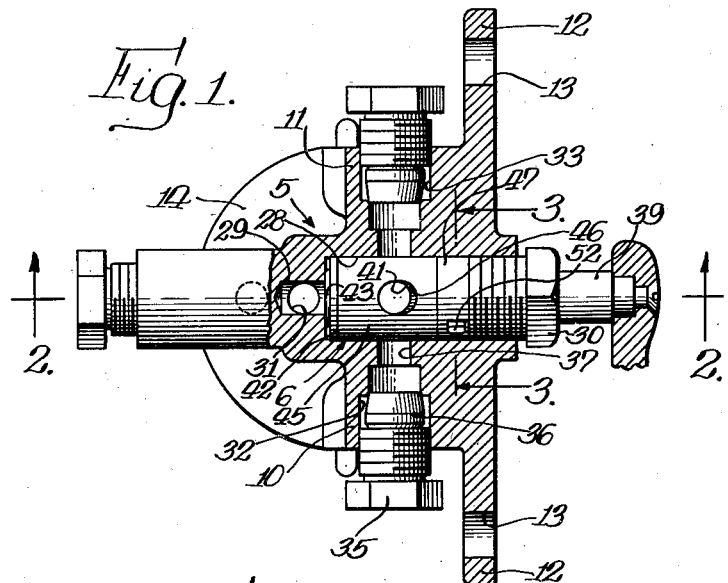
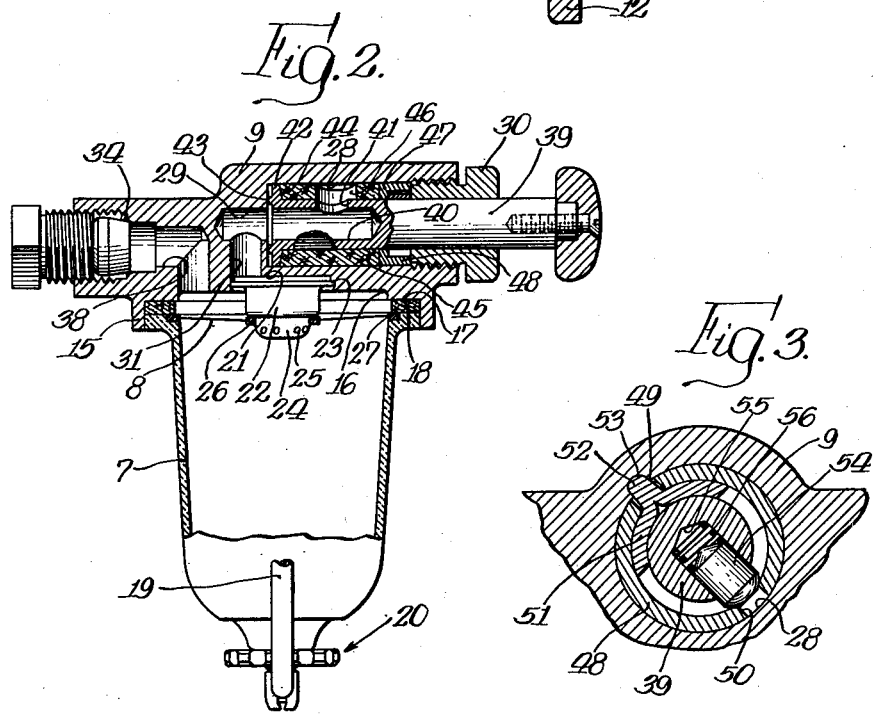
INVENTOR.
George E. Franck,
BY
his Att'ys Patented Feb. 28, 1950

2,499,022

UNITED STATES PATENT OFFICE 2,499,022

VALVE MEANS

George E. Franck, Riverside, Ill., assignor to The Imperial Brass Manufacturing Company, Chicago, Ill., a corporation of Illinois Application November 29, 1945, Serial No. 631,617

10 Claims. (Cl. 251—95)

The invention relates generally to valve means and more particularly to valve means of the plug type adapted for the handling of fuels for internal combustion engines.

One object of the invention is to provide a new and improved valve means of the plug type which has a tight, leakage preventing fit throughout its life and which has a long life.

Another object is to provide a valve means of the plug type having a resilient composition-to-metal relationship between its contacting surfaces.

Another object is to provide a valve means of the rotary plug type in which the main portion of the plug is composed of a resilient composition and can be expanded radially to take up wear.

A further object is to provide valve means of the rotary plug type having common means serving as a packing gland and as a part of detent means.

Other objects and advantages will become apparent from the following detailed description taken in connection with the accompanying drawings, in which:

Fig. 1 is a horizontal sectional view of a strainer embodying the features of this invention.

Fig. 2 is a vertical longitudinal sectional view taken approximately along the line 2—2 of Fig. 1.

Fig. 3 is an enlarged fragmentary sectional view taken approximately along the line 3—3 of Fig. 1.

While the invention may be susceptible of various modifications and alternative constructions, it is herein shown and will hereinafter be described in a preferred embodiment. It is not intended, however, that the invention is to be limited thereby to the specific construction disclosed. On the contrary it is intended to cover all modifications and alternative constructions falling within the spirit and scope of the invention as defined in the appended claims.

For purposes of disclosure, the valve means is herein shown and will hereinafter be described as embodied in a strainer of the type employed in the fuel systems of internal combustion engines. Such a strainer comprises generally a body 5 serving as a housing for valve means, generally designated 6, and as a support for a bowl or cup 7 containing straining means proper, which may take a variety of forms but is here shown as an annular gauze screen element 8. The body 5 is, roughly speaking, T-shaped with the stem of the T formed by a portion 9 and the cross bar formed by portions 10 and 11 extending laterally of the portion 9. Projecting still farther laterally are a pair of ears 12 each having an aperture 13 whereby the strainer may be supported as by bolting to a suitable member. On the underneath side the body 5 is formed with a circular portion 14 having a depending annular flange 15 forming a recess in which the upper open end of the bowl 7 is received. Inwardly of the flange 15 the circular portion 14 is slightly further recessed, as at 16, to form an annular shoulder 17 between which and the upper edge of the bowl 7 there is preferably interposed a sealing gasket 18. The bowl 7 is removably supported in position by means of a bail 19 which depends from the body 5 and carries at its lower end screw means 20 for forcing the bowl tightly against the gasket 18. Concentric with the flange 15 and the recess 16 is another shallow and shouldered recess 21 of a diameter smaller than the recess 16 for the reception of an upwardly opening thimble 22. The thimble is retained in the recess 21 by swedging the portion of the body 9 surrounding the recess 21 slightly over the flange 23 formed on the upper open end of the thimble. At its closed, herein lower, end the thimble has a reduced portion 24 formed with apertures 25 opening through the sides thereof, which reduced portion projects with a reasonably tight fit through the central ring 26 of the annular gauze screen 8. An external ring 27 of the gauze screen is secured between the bowl 7 and the gasket 18 in a recess formed in the bowl for that purpose.

Formed in the portion 9 of the body is a bore 28 opening outwardly of the body through one end of the portion 9, herein the right-hand end or top of the T, as viewed in Figs. 1 and 2. Opening axially to the bore 28 through the closed or inner end thereof is a passage 29 concentric with but smaller than the bore 28. At its outer end, the bore 28 is internally threaded for the threaded reception of a sleeve nut 30 as will hereinafter be more particularly described. Forming a part of the passage 29 is a radial passage 31, which communicates at its other end with the recess 21 and hence with the interior of the thimble 22.

Formed respectively in the laterally extending portions 10 and 11 and in the main portion are recesses 32, 33 and 34, with the recesses 32 and 33 serving as inlet ports and the recess 34 serving as an outlet or discharge port. The ports are adapted for the connection of tubing therein and for that purpose each recess is internally threaded for the reception of a tube coupling nut 35 and, as shown, in each recess is a sealing sleeve 36. Leading from each of the recesses 32 and 33 is a passage 37 opening radially to the bore 28 at diametrically opposed points. The recess 34 or discharge port is by a passage 38 connected to the recess 16 so as to be in communication with the bowl 7 on the opposite side of the strainer 8 from the thimble 22.

Received rotatably within the bore 28 is a valve element of the plug type. Herein this comprises a stem 39 substantially smaller in external diameter than the bore 28. At its inner end the stem 39 is formed with a bore 40 and with a radial port 41, the bore 40 opening through the inner end of the stem to be in constant communication with the passage 29. The stem 39 is also formed at its inner end with a radially outwardly extending flange 42 and with an axially extending annular bead 43. The flange 42 has a diameter just slightly less than the bore 28 and has its outwardly facing face 44 forming a slight angle with a true perpendicular to the axis of the stem 39. The bead 43 has a diameter larger than the passage 29 so as to bear against and form a seal with the annular shoulder formed between the bore 28 and the passage 29.

Surrounding the stem at its inner end is a sleeve 45 of a suitable packing material, by way of example, a material now on the market composed of cork and neoprene. The sleeve 45 is formed with a radial port 46 of generally oval shape. The sleeve 45 is applied to the stem with the port 46 is registry with the port 41 in the stem and has the larger dimension of the oval port 46 extending longitudinally of the stem for a purpose that will presently be made known. Preferably the stem over the portion receiving the sleeve 45 is serrated so as to assure against circumferential displacement of the sleeve 45 relative to the stem.

A feature of this invention is the employment of a construction resulting in a combination packing gland and detent stop. To that end, there is slidably mounted on the stem, outwardly of the packing sleeve 45, an annular ring 47 having an axially outwardly extending flange 48 having an external diameter just slightly smaller than the bore 28 and an internal diameter considerably larger than the stem 39, so as to leave therebetween an annular space. Formed in the flange 48 is an outwardly opening notch 49 and diametrically opposite the notch 49 is a second aperture 50, though a recess formed internally of the flange 48 would serve as well. Received in the space formed between the flange 48 and the stem 39 is an arcuate member 51 formed with a radial, outward projection 52 projecting through the notch 49 in the flange 48 and into a groove 53 formed in the bore 28. Carried by the stem 39 for cooperation with the aperture 50 in the flange 48 and the arcuate member 51 is a small plunger 54 received slidably in a radial bore 55 in the stem and urged outwardly of the bore by a compression spring 56 in the well known manner of detent means. It will be readily seen, particularly from Fig. 3, that the plunger 54 engages the aperture 50 when the stem 39 is in a central or neutral position and limits rotation of the stem in either direction by abutment with the ends of the arcuate member 51. It will be appreciated, of course, that the various parts are so positioned that the valve means will be closed when the plunger 54 engages the aperture 50, and that the port 46 of the valve element will register with one or the other of the passages 37 when the plunger 54 is in abutment with one or the other of the ends of the arcuate member 51. The ring 47 and the arcuate member 51 are retained in proper position by the sleeve nut 30 already mentioned.

It will be apparent from the foregoing that the packing sleeve 45 serves not merely as a packing in the conventional manner but forms the central and active part of the valve element. It moreover forms a yieldable and resilient part assuring a tight seal with the bore 28 at all times. As wear takes place the sleeve nut 30 can be turned in a little further, thereby compressing the packing 45 axially and forcing it to expand laterally or radially and thus renewing the tightness of the seal. It is in contemplation of such axial contraction of the packing that the port 46 is made oval, thereby permitting such axial contraction without reducing the effectiveness of the port 41 in the stem. Moreover, the ring 47 not only functions as a packing gland but also as a detent stop permitting the inclusion of detent means with a reduced number of parts and in a compact manner.

I claim as my invention:

1. Valve means comprising a casing having a bore opening at one end through the casing, a first passage opening to the bore radially through the side thereof and a second passage opening to the bore axially through the closed end thereof, a valve element having a tight but rotatable fit within the bore comprising a valve stem of a diameter smaller than the bore having at its inner end an axial bore opening through the inner end of said stem, a radial port communicating with the bore in said stem and a radially outwardly extending flange, an annular sleeve of resilient, deformable composition material having a radial port therein nonrotatably mounted on said stem with the port in said sleeve in registry with the port in said stem, both ports being positioned for registry with the passage opening radially to the bore when said valve element is in proper angular position, an annular packing gland rotatably and slidably mounted on said valve stem at the end of said annular sleeve opposite the flange on said stem, and a nut threaded into the open end of said bore and bearing at its inner end against said packing gland.

2. Valve means comprising a casing having a bore opening at one end through the casing, a first passage opening to the bore radially through the side thereof and a second passage opening to the bore axially through the closed end thereof, a valve element having a tight but rotatable fit within the bore comprising a valve stem of a diameter smaller than the bore having at its inner end an axial bore opening through the inner end of said stem, a radial port communicating with the bore in said stem and a radially outwardly extending flange, the inner end of said stem bearing against the inner end of the bore, an annular sleeve of resilient, deformable composition material having a radial port therein nonrotatably mounted on said stem with the port in said sleeve in registry with the port in said stem, the port in said sleeve having an axial dimension larger than that of the port in said stem, both ports being positioned for registry with the passage opening radially to the bore when said valve element is in proper angular position, an annular packing gland rotatably and slidably mounted on said valve stem at the end of said annular sleeve opposite the flange on said stem, and a nut threaded into the open end of said bore and bearing at its inner end against said packing gland to compress said sleeve axially and thereby distort the sleeve radially into fluid-tight engagement with the bore.

3. Valve means comprising a casing having a bore opening at one end through the casing, a first passage opening to the bore radially through the side thereof and a second passage opening to the bore axially through the closed end thereof, a valve element having a tight but rotatable fit within the bore comprising a valve stem of a diameter smaller than the bore having at its inner end an axial bore opening through the inner end of said stem, a radial port communicating with the bore in said stem, a radially outwardly extending flange, an axially inwardly extending annular bead of a diameter larger than the second passage in said casing, an annular sleeve of resilient, deformable composition material having a radial port therein nonrotatably mounted on said stem with the port in said sleeve in registry with the port in said stem, both ports being positioned for registry with the passage opening radially to the bore when said valve element is in proper angular position, an annular packing gland rotatably and slidably mounted on said valve stem at the end of said annular sleeve opposite the flange on said stem, and a nut threaded into the open end of said bore and bearing at its inner end against said packing gland.

4. Valve means comprising a casing having a bore opening at one end through the casing, a first passage opening to the bore radially through the side thereof and a second passage opening to the bore axially through the closed end thereof, a valve element having a tight but rotatable fit within the bore comprising a valve stem of a diameter smaller than the bore having at its inner end an axial bore opening through the inner end of said stem, a radial port communicating with the bore in said stem, a radially outwardly extending flange having an axially outwardly facing face inclined at an angle to a true perpendicular to the axis of said stem, said stem bearing at its inner end against the end wall of the bore, an annular sleeve of resilient, deformable composition material having a radial port therein nonrotatably mounted on said stem with the port in said sleeve in registry with the port in said stem, both ports being positioned for registry with the passage opening radially to the bore when said valve element is in proper angular position, an annular packing gland rotatably and slidably mounted on said valve stem at the end of said annular sleeve opposite the flange on said stem, and a nut threaded into the open end of said bore and bearing at its inner end against said packing gland.

5. Valve means comprising a casing having a bore opening at one end through the casing, a first passage opening to the bore radially through the side thereof and a second passage opening to the bore axially through the closed end thereof, a valve element having a fluid-tight but rotatable fit within the bore comprising a valve stem of a diameter smaller than the bore having at its inner end an axial bore opening through the inner end of said stem and a radial port communicating with the bore in said stem, an annular sleeve of resilient, deformable composition material having a radial port therein mounted on said stem for rotation therewith, with the port in said sleeve in registry with the port in said stem, both ports being positioned for registry with the passage opening radially to the bore when said valve element is in proper angular position, a plunger in said stem spring pressed radially outwardly, means nonrotatably but axially slidably received in the bore in surrounding relation to said stem and acting jointly as a packing gland for said sleeve and means cooperating with said plunger to indicate closed and open positions of the valve means, and a nut threaded into the open end of the bore to retain said last mentioned means in proper position axially of the bore.

6. Valve means comprising a casing having a bore opening at one end through the casing, a first passage opening to the bore radially through the side thereof and a second passage opening to the bore axially through the closed end thereof, a valve element having a fluid-tight but rotatable fit within the bore comprising a valve stem of a diameter smaller than the bore having at its inner end an axial bore opening through the inner end of said stem and a radial port communicating with the bore in said stem, an annular sleeve of resilient, deformable composition material having a radial port therein mounted on said stem for rotation therewith, with the port in said sleeve in registry with the port in said stem, both ports being positioned for registry with the passage opening radially to the bore when said valve element is in proper angular position, a plunger in said stem spring pressed radially outwardly, an annular ring received within the bore in surrounding relation to said stem and operable as a packing gland, means operable to retain said ring in nonrotatably fixed relation within the bore and also serving as a limit stop for engagement by said plunger, said annular ring having formed therein means for cooperation with said plunger to indicate a closed position of the valve means, and a nut threaded into the open end of the bore and bearing at its inner end against said annular ring.

7. Valve means comprising a casing having a bore opening at one end through the casing, a first passage opening to the bore radially through the side thereof and a second passage opening to the bore axially through the closed end thereof, a valve element having a fluid-tight but rotatable fit within the bore comprising a valve stem of a diameter smaller than the bore having at its inner end an axial bore opening through the inner end of said stem and a radial port communicating with the bore in said stem, an annular sleeve of resilient, deformable composition material having a radial port therein mounted on said stem for rotation therewith, with the port in said sleeve in registry with the port in said stem, both ports being positioned for registry with the passage opening radially to the bore when said valve element is in proper angular position, a plunger in said stem spring pressed radially outwardly, an annular ring having an axially outwardly extending flange of an internal diameter larger than said stem, the flange having a notch opening outwardly and a recess disposed diametrically opposite to the notch, an arcuate member received in the space between said stem and said flange having a radial projection extending through the notch in said ring, means formed in said casing adapted to be engaged by said projection for locking said ring and said arcuate member in fixed angular position relative to said casing for cooperation with said plunger as detent means and a nut threaded into the open end of said bore and bearing at its inner end against said ring and said arcuate member.

8. Valve means comprising a casing having a bore opening at one end through the casing, a pair of ports, a passage leading from each of the ports and opening to the bore radially through the side thereof, and a third passage opening to the bore axially through the closed end thereof, a valve element having a fluid-tight but rotatable fit within the bore comprising a valve stem of a diameter smaller than the bore having at its inner end an axial bore opening through the inner end thereof, a radial port communicating with the bore in said stem and a radially outwardly extending flange, an annular sleeve of resilient, deformable composition material having a radial port therein nonrotatably mounted on said stem with the port in said sleeve in registry with the port in said stem, both ports being positioned for registry with the first named passages when said valve element is in proper angular position, an annular packing gland rotatably and slidably mounted on said valve stem for compressing said sleeve axially between it and said flange to deform said sleeve radially into fluid-tight fit with the bore, said gland having an annular axially outwardly extending flange of an internal diameter larger than said stem and having formed therein a notch opening outwardly and generally opposite the notch, a recess opening radially inwardly, an arcuate member positioned in the annular space between said flange and said stem and having a radial projection extending through the notch in said flange, a groove formed in said casing opening to the bore for engagement therewith of said projection for retaining said packing gland and said arcuate member in fixed angular position relative to said casing while permitting of movement axially of the bore, a plunger spring-pressed radially outwardly carried by said stem for cooperation with said arcuate member and said packing gland to indicate closed position of the valve means and to limit and designate the necessary extent of rotation of said valve element for registry with one or the other of the passages opening radially to the bore, and a nut threaded into the open end of the bore and bearing at its inner end against said packing gland to determine the axial compression of said sleeve.

9. Valve means comprising a body member forming a valve housing and a support for a strainer bowl, said body member being generally T-shaped with a circular portion on its underneath side when in normal position of use, the circular portion being recessed for the reception of the upper open end of a strainer bowl, said body member having formed therein a bore extending longitudinally of the member and opening outwardly of the member at the top of the T, a first passage opening at one end to the bore through the closed end thereof and concentric with the bore and opening at the other end to the recess in said circular portion, a second passage opening at one end to the recess in said circular portion and at the other end through the base of the T for the connection of a conduit thereto, a pair of ports opening outwardly of said body member at the ends of the cross bar portion of the T and communicating with the bore through passages opening radially to the bore, a rotary plug type valve element received in the bore comprising a stem having at its inner end a radial port and an axial passage, the latter opening through the inner end of said stem for constant communication with said first passage and a radially outwardly projecting flange, a sleeve-like nonmetallic packing nonrotatably fixed on the inner end of said stem having a radial port in registry with the radial port in said stem, an annular member receivable in the bore and in surrounding relation to said stem forming a gland for said packing adjustable axially of said stem to vary the axial compression of said packing and thus the tightness of the fit between said packing and the bore, and a sleeve nut threaded into the open end of the bore and bearing against said gland member to determine the axial position thereof.

10. Valve means comprising a body member forming a valve housing and a support for a strainer bowl, said body member being generally T-shaped with a circular portion on its underneath side when in normal position of use, the circular portion being recessed for the reception of the upper open end of a strainer bowl, said body member having formed therein a bore extending longitudinally of the member and opening outwardly of the member at the top of the T, a first passage opening at one end to the bore through the closed end thereof and concentric with the bore and opening at the other end to the recess in said circular portion, a second passage opening at one end to the recess in said circular portion and at the other end through the base of the T for the connection of a conduit thereto, a pair of ports opening outwardly of said body member at the ends of the cross bar portion of the T and communicating with the bore through passages opening radially to the bore, a rotary plug type valve element received in the bore comprising a stem having at its inner end a radial port and an axial passage, the latter opening through the inner end of said stem for constant communication with said first passage and a radially outwardly projecting flange, a sleeve-like nonmetallic packing nonrotatably fixed on the inner end of said stem having a radial port in registry with the radial port in said stem, an annular ring receivable in the bore and forming an axially adjustable packing gland for said packing, said ring having an axially outwardly projecting annular flange having an internal diameter larger than the diameter of said stem and having formed in the flange a radial opening and a diametrically opposed internal recess, an arcuate element adapted to be interposed between said stem and the flange on said ring and having a radial projection extending through the opening in said ring, a groove in said body member opening to the bore adapted to receive said projection for retaining said ring and said arcuate member in a fixed angular position, a sleeve nut threaded into the open end of the bore for retaining said arcuate member in said ring and said ring in desired axial position, and means carried by said stem adapted to engage the recess in said ring to indicate the closed position of the valve means and abutting against the ends of said arcuate member to indicate and aid in the positioning of the valve in valve-open position.

GEORGE E. FRANCK.

REFERENCES CITED

The following references are of record in the file of this patent:

UNITED STATES PATENTS

| Number | Name | Date |
| --- | --- | --- |
| 1,817,258 | Klinger | Aug. 4, 1931 |
| 1,892,344 | Huber | Dec. 27, 1932 |
| 1,943,865 | Hennessey | Jan. 16, 1934 |
| 2,210,335 | Mueller | Aug. 6, 1940 |
| 2,222,626 | Mueller | Nov. 26, 1940 |